United States Patent
Bonaiti et al.

(10) Patent No.: US 6,282,879 B1
(45) Date of Patent: Sep. 4, 2001

(54) SHACKLE (CLEVIS) FOR HOOKING ONTO A CHAIN

(75) Inventors: Marco Bonaiti, Lecco; Sauro Servadei, Ravenna, both of (IT)

(73) Assignee: Kong S.p.A., Lecco (IT)

( * ) Notice: Subject to any disclaimer, the term of this patent is extended or adjusted under 35 U.S.C. 154(b) by 0 days.

(21) Appl. No.: 09/629,857

(22) Filed: Aug. 1, 2000

(30) Foreign Application Priority Data

Aug. 6, 1999 (IT) .............................................. MI99A1793

(51) Int. Cl.⁷ .............................. F16G 15/04; F16G 13/18
(52) U.S. Cl. ........................................................ 59/86; 59/93
(58) Field of Search .................................... 59/78, 85, 86, 59/93

(56) References Cited

U.S. PATENT DOCUMENTS

| | | | |
|---|---|---|---|
| 285,962 | * 10/1883 | Bracken | 59/86 |
| 1,222,997 | * 4/1917 | Rottmer | 59/86 |
| 2,259,217 | 10/1941 | Stevenson . | |
| 3,224,185 | * 12/1965 | Grim et al. | 59/86 |
| 3,583,751 | 6/1971 | White . | |
| 3,817,028 | * 6/1974 | Blackwood | 59/86 |
| 3,962,755 | * 6/1976 | Buschini et al. | 59/86 |
| 4,020,630 | 5/1977 | DeShetler . | |
| 4,134,255 | * 1/1979 | McBain et al. | 59/78 |
| 5,647,198 | * 7/1997 | Mihailovic | 59/86 |

FOREIGN PATENT DOCUMENTS

| | | | |
|---|---|---|---|
| 2672358A1 | 8/1992 | (FR) . | |
| 112796 | * 1/1918 | (GB) | 59/86 |
| 1452358 | 10/1976 | (GB) . | |

* cited by examiner

Primary Examiner—David Jones
(74) Attorney, Agent, or Firm—Young & Thompson

(57) ABSTRACT

A shackle or clevis for hooking to the link of a chain, of the type comprising an external support half-ring formed by an arch of the half-ring and by two legs of the half-ring which originate from the opposite ends of said arch, each of the two legs having the terminal end widened and provided with a transverse hole which, in the position of closure of the shackle, is aligned with the transverse hole of the other one; and a bolt, possibly unlosable, slidingly supported in the hole of a leg so as to be inserted in the hole of the other leg, provided with means for locking closure of the shackle; said shackle also comprises inside the support half-ring a fork which can be inserted on a diameter of the two straight sides of the link of chain to be hooked and which can be clamped between the links chained to said chain link to be hooked, said fork having each leg integral with and parallel to a corresponding leg of the support half-ring and mouth lying on the side of the bolt.

11 Claims, 2 Drawing Sheets

SHACKLE (CLEVIS) FOR HOOKING ONTO A CHAIN

FIELD OF THE INVENTION

The present invention relates to a shackle structure to be secured to the link of a chain.

BACKGROUND OF THE INVENTION

A shackle, commonly also referred to as a clevis or shank, is composed, as known, of a half-ring usually in steel with a U or horseshoe shape, wherein the ends of the legs are widened and perforated to allow the passage of a bolt for closure which can be threaded to screw into one of the holes, also threaded, or which alternatively can be locked to the relative leg by means of a split pin. In nautical applications a shackle is widely used for example for connecting two chain sections one to the other, for securing a chain to a fixed eye or to the anchor, or to a buoy.

As is known, a shackle is attached by linking the bolt to the chain link to be hooked, and this, for standard chains wherein the span in the link theoretically extends axially for a section equal to three times the diameter of the link, means in practice that the diameter of the bolt of the shackle has to be smaller than that of the chain link.

The span actually available for hooking the bolt, having subtracted the overall dimension of the arch of the links chained to the link to be hooked, is slightly smaller than the diameter of the link, due both to the curve of the arches of the links which are chained and to the thickness of additional zinc-plating of these same links. This leads to the need to use a smaller shackle. Naturally the presence of a smaller shackle causes a weakening of the hooking to the link of the chain, and the relevant bolt becomes the most fragile point of breakage from tensile stress.

SUMMARY OF THE INVENTION

The object the present invention is therefore that of providing a shackle which remedies the disadvantages suffered by a traditional shackle and in particular one object is that of providing a shackle for a chain which provides solid hooking to the link of a chain and namely hooking with resistance to breakage from tensile stress no less than the intrinsic resistance of each link of the chain.

Another object of the present invention is that of providing a shackle for a chain which has a simple structure and principle of operation and for this reason is also inexpensive.

Yet another object of the present invention is that of providing a shackle for a chain which can also be adapted with versatility to links of chains of different sizes.

These and other objects are achieved with a shackle for a chain in accordance with the present invention, of the type comprising:

an external support half-ring formed by an arch of the half-ring and by two legs of the half-ring which originate from the opposite ends of said arch, each of the two legs having the terminal end widened and provided with a transverse hole which, in the position of closure of the shackle, is aligned with the transverse hole of the other one; and a bolt, possibly unlosable, slidingly supported in the hole of one leg to insert in the hole of the other leg with means for locking closure of the shackle. The shackle is characterised by the fact of providing, inside the support half-ring, a fork shared element which can be inserted on a diameter of the two straight sides of the chain link to be hooked and can be damped between the chained links to said chain link to be hooked, said fork having each leg integral with and parallel to a corresponding leg of the support half-ring and mouth lying on the side of the bolt.

The shackle of the present invention advantageously offers a point of hooking to the chain which has a resistance to breakage from tensile stress equal at least to the intrinsic resistance of a link of the chain, given that the shackle can embrace externally the entire link with a bolt of diameter even greater than that of the link itself.

The sliding on the chain of the shackle of the present invention is locked in that, while the link is inserted in the fork and restrained therein by the bolt brought into the position of closure, the upper and respectively lower wall of the fork hit against the arch of the chain link above the hooked link and respectively on the arch of the chain link below the hooked link and the fork remains restrained there.

BRIEF DESCRIPTION OF THE DRAWINGS

Other advantages of the present invention will be made clearer on reading some of its preferred embodiments which refer to the accompanying drawings in which.

DESCRIPTION OF THE PREFERRED EMBODIMENTS

Figure 1A:
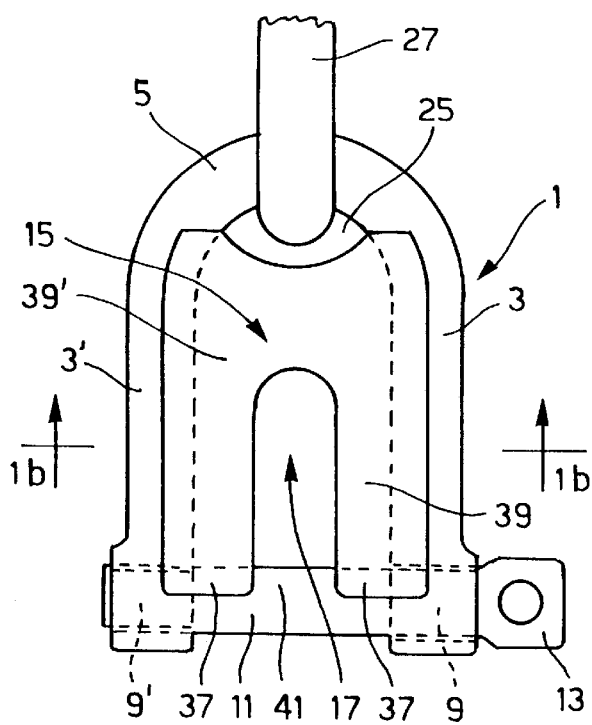
FIG. 1*a* shows a plan view of a first preferred embodiment of the shackle of the present invention.
Figure 1C:
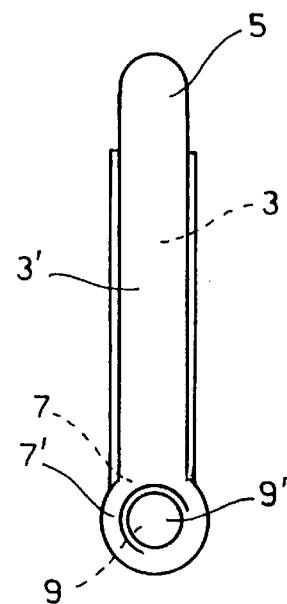
FIG. 1*c* shows a side view of the shackle of FIG. 1*a*.

In FIGS. 1*a*—1*d* the shackle 1 comprises an external U-shaped support half-ring formed by two legs 3 and 3' rigidly connected via an arch 5.

The front terminal section of each leg 3 and 3' of the shackle 1 defines enlargements 7 and 7' having respective transverse through holes 9 and 9', distanced yet aligned, wherein a threaded bolt 11 is guided to slide.

The bolt 11 is mobile between a position of opening of the shackle 1, occupied when the head 13 is moved away from the hole 9, and a position of closure of the shackle, occupied when the head 13 hits against the external side wall of the hole 9 and the threaded end of the bolt 11 is inserted in the hole 9'.

The end of the boft 11 is threaded so as to screw the bolt 11 to the hole 9', also threaded, in such a way as to guarantee locking of the closure of the shackle.

The shackle 1 also comprises a fork 15 placed inside the support half-ring, whose two legs 39 and 39' are integral with and parallel to the corresponding legs 3 and 3' of the support half-ring, and whose mouth 41 is turned on the side of the bolt 11. The fork 15 is in the form of an insert with a U-shaped internal side wall 17 dimensioned so as to be inserted simultaneously on a diameter of the two straight sides of the chain link which has to be hooked.

In order to guarantee in every case hooking with resistance to breakage from tensile stress no less than the intrinsic resistance of the chain, the diameter of the bolt 11 has been made equal to the diameter of chain to be hooked by the shackle 1, but a bolt can likewise be used with even greater diameter.

In order to be able to embrace completely a chain with diameter equal to the diameter of the bolt 11, also considering that in a standard chain the width of the link is equal to approximately three times its diameter, the U-shaped internal side wall 17 of the insert 15 has a mouth 41 greater than the diameter of the bolt 11 and depth greater by three times the diameter of the bolt 11.

In the present embodiment the diameter of the bolt 11 is 10 mm exactly like the diameter of the link 19 of chain 21 to be hooked. The opening of the mouth 41 of the internal side wall 17 is 12 mm, while its depth is 32 mm and its height 8 mm.

Naturally the dimensions of the component parts of a shackle in accordance with the present invention may differ from those now described and vary according to the chain which has to be hooked.

The insert 15 is attached onto the shackle 1 by means of a groove 23 and respectively 23' which extends from the front end to the rear end of the external side walls of the insert 15.

The cross section of the groove 23 and respectively 23' defines a circumference arc with curvature equal to that of the round leg 3 and respectively 3' of the half-ring of the shackle 1.

The insert 15 is engaged on the half-ring of the shackle 1 by first inserting frontally the rear wall of the insert 15 in the mouth of the half-ring of the shackle 1 and then pushing with a light pressure the groove 23 and respectively 23' to slide on the internal side wall of the adjacent leg 3 and respectively 3' of the half-ring of the shackle 1 until the rear end of the groove 23 and respectively 23' rests on the arch 5 of the half-ring of the shackle 1.

In FIG. 1a each front end 37 of the two legs of the fork 15 also has a groove, shaped and orientated like the bolt 11 so as to guide its sliding. When the bolt 11 is in the position of closure of the mouth of the fork 15 these grooved portions 37 engage on the bolt 11 and thus also allow support of the fork 15.

The introduction of the insert 15 in the half-ring of the shackle 1 is partially obstructed by the enlargements 7 and 7' for the passage of the bolt 11, but this offers the advantage that, when the insert 15 is held in position by the legs of the half-ring of the shackle 1 and by the bolt 11, only a very strong action, of intensity greater than the normal stresses caused during use, is capable of removing it.

The rear side wall of the insert 15 defines with the arch 5 of the shackle 1 a span 25 for hooking to the shackle 1 the element to be connected to the chain, represented by way of an example by a ring 27.

The removable engaging between the insert 15 and the half-ring of the shackle 1 advantageously allows the ring 27 to be hooked preliminary onto the shackle 1.

Figure 1B:
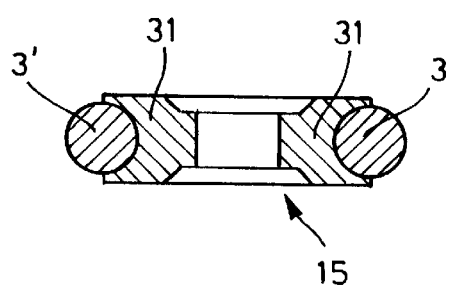
FIG. 1*b* shows a front view sectioned along line 1*b*—1*b* of FIG. 1*a*.
Figure 1D:
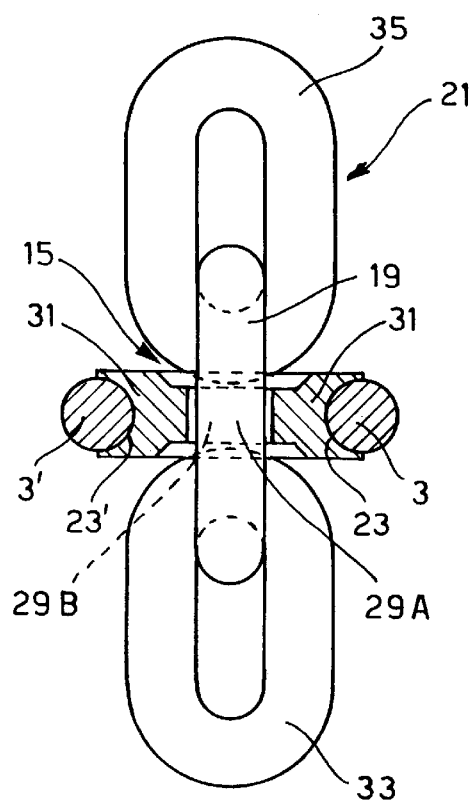
FIG. 1*d* shows a partially sectioned front view of the method of hooking of the shackle of FIG. 1*a*.

As shown in FIGS. 1b and 1d, the innermost portion of the insert 15 has a reduction in thickness to allow insertion of the shackle 1 on the link and consequently lock sliding of the same along the chain 21.

The operation of hooking of the shackle 1 to the link 19 of the chain 21 in fact provides, in the first place, for frontal insertion of the mouth of the fork on the diameter of the median point of the straight sides at the rear 29B first and front 29A subsequently of the chain link to be hooked, in such a way that the upper and respectively lower wall of the reduced thickness 31 of the fork hit against the lower arch of the overlying chain link 35 and respectively on the upper arch of the underlying chain link 33, thus locking sliding of the shackle 1 along the chain 21.

Subsequently the bolt 11 is screwed into the corresponding hole 9' to close and lock the closure of the shackle which restrains the link 19 in its interior.

The bolt of the present invention can be, as in the aforesaid preferred embodiment, of the unlosable type. For this purpose the innermost tip of the threaded portion of the bolt 11 is widened to hit against the internal side of the hole 9 in the position of maximum opening of the shackle so as to avoid withdrawal of the bolt 11 from the hole 9.

Naturally, for effective hooking, a shackle of appropriate size has to be chosen for each type, that is to say for each diameter of chain.

To avoid sliding of the shackle along the chain the fork cannot have any proportions whatsoever in relation to the diameter of the chain to be hooked. In particular the opening of the mouth of the fork has to be greater or equal to the size of the diameter of the link but smaller by three times this size in order to be able to grip on the overlying and underlying chain links oriented at 90 degrees in relation to the link to be hooked. It is in any case always preferable for the size of the mouth of the fork not to exceed 50% of the value of the diameter of the link to be hooked, to avoid the risk that, with a mouth having a large opening, a slight relative angular rotation between the hooked link, and the links of the chain chained thereto, may cause withdrawal of the fork from the hooked link.

On the other hand the height of the fork must be smaller than the diameter of the chain to allow the fork itself to be inserted between the lower arch of the chain link above and the upper arch of the chain link below the hooked link. Taking into consideration this criterion of compatibility of a chain with a shackle in accordance with the present invention, it is advantageously possible to use the shackle of the present invention for at least two types of chain, that is to say at least also for the link calibrated with a diameter size smaller than that intended for normal use.

In the case in question of the preferred embodiment described above, for example the shackle 1 can also be adopted for chains with diameter of 8 mm.

The following preferred embodiments differ from the present one only by the form wherein the fork is provided, therefore, for the sake of brevity, we will omit the description of the other parts of the shackle or of its mode of use, which we will tacitly assume to be the same as those illustrated hitherto.

Figure 2A:
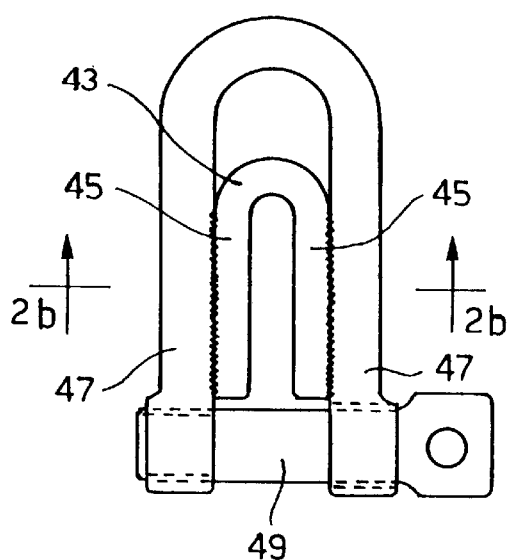
FIG. 2*a* shows a plan view of a second preferred embodiment of the shackle of the present invention.
Figure 2B:
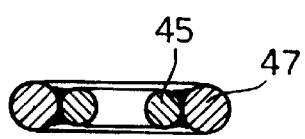
FIG. 2*b* shows a front view sectioned along line 2*b*—2*b* of FIG. 2*a*.

In FIGS. 2a–b the second preferred embodiment of the present invention differs from the previous one only by the shape of the fork and its attachment to the support half-ring.

The fork in this case is an insert 43 with a horseshoe shape and with a smaller diameter compared to the diameter of the support half-ring and spatially oriented like the support half-ring, with the front ends of the two legs 45 of the fork this time no longer in contact with the bolt 49.

The insert 43 is fixed to the half-ring by welding between the external side wall of one leg 45 and the internal side wall of the corresponding leg 47 of the support half-ring.

The space formed between the arch of the support half-ring and the arch of the fork 43 is used for inserting the element to be connected to the chain.

Figure 3A:
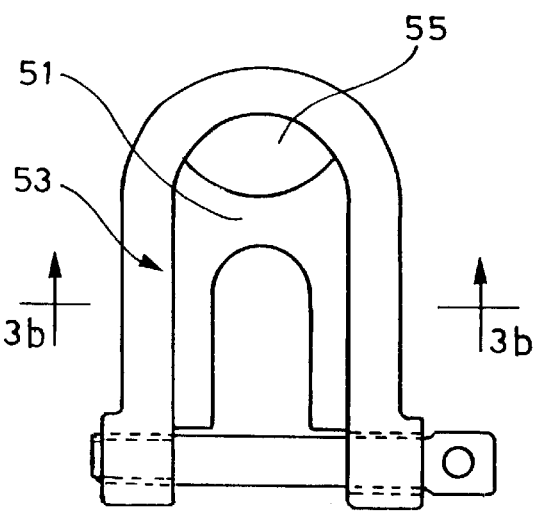
FIG. 3*a* shows a plan view of a third preferred embodiment of the shackle of the present invention.
Figure 3B:
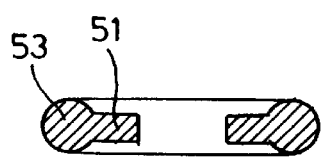
FIG. 3*b* shows a front view sectioned along line 3*b*—3*b* of FIG. 3*a*.

FIGS. 3a–b show a third preferred embodiment of the present invention wherein the fork 51 is now presented as moulding of the internal side wall of the support half-ring obtained by die-casting or forging.

From the moulding of the half-ring a fork 51 is obtained with U-shaped internal side wall and with a height smaller in size compared to the diameter of the support half-ring 53.

The rear side wall of the fork 51 formed in this way describes, with the arch of the support half-ring 53, an opening 55 for insertion of the element to be connected to the chain.

Figure 4:
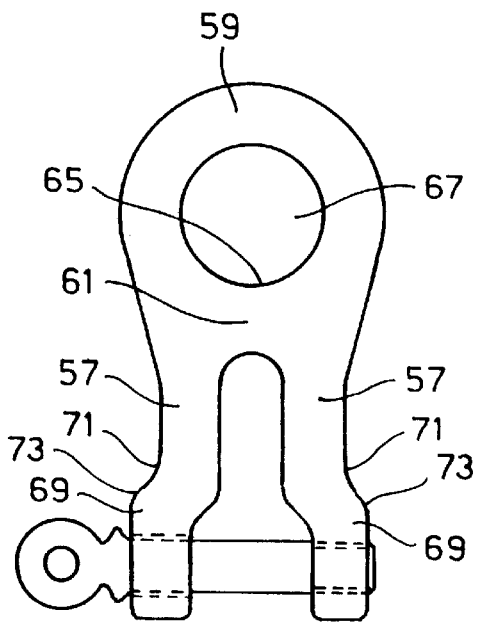
FIG. 4 shows a plan view of a fourth preferred embodiment of the present invention.

FIG. 4 illustrates another embodiment of the shackle of the present invention with the fork formed by the moulding of the support half-ring, wherein the two legs of the fork coincide with the legs 57 of the support half-ring.

In moulding the fork from the support half-ring the arched rear side wall 65 defines with the internal wall of the arch 59 of the support half-ring an eye 67 for the passage of the element to be connected to the chain.

The U-shaped profile of the support half-ring in this case is modified by performing on the terminal portion 69 of the legs 57 of the fork a first bending 71 towards the exterior of the shackle and a second bending 73, outside of the first, towards the interior of the shackle to widen the mouth of the fork itself and thus allow its insertion on the chain link without impediment by the enlargements for the holes for passage of the bolt.

It is dear that the present description of preferred embodiments must be read purely by way of an indication, the fork in any case being able to assume other shapes not considered here, without thereby departing from the more general principle provided by the present invention.

The shape and structure of the external support half-ring may also undergo changes, remaining within the sphere of the present invention.

Figure 5:
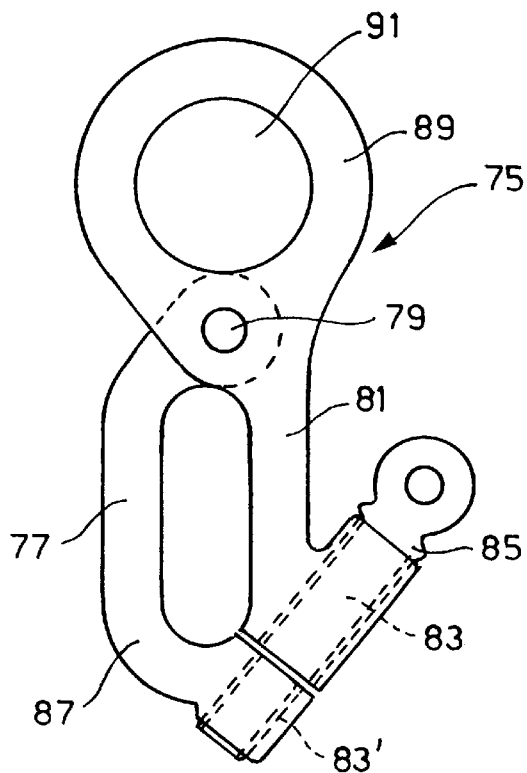
FIG. 5 shows a plan view of another preferred embodiment of the present invention wherein the support half-ring is not rigid but has a leg which is articulated from the rest of the body.

By way of an example, in FIG. 5, we have illustrated an external support half-ring structure 75, not rigid but instead jointed.

The half-ring is formed by a leg 81 wherefrom the arch 89 of the half-ring projects in one piece and joins to the leg 81 to define an eye 91 for the element to be connected to the chain.

The other leg 77 of the half-ring is now hinged in 79 to the rest of the body 75 in such a way that, in its rotated position of opening of the shackle, the holes 83 and 83' are moved away and misaligned and the internal wall of the two legs 77 and 81 of the half-ring 75 defines a fork to be inserted on the chain link which has to be hooked.

Once the fork has been inserted in the chain link, the leg 77 is made to rotate into its position of closure of the shackle wherein the two internal sides of the holes 83 and 83' are substantially in contact, aligning for the passage of the threaded bolt 85.

The axis of the holes 83 and 83' in position of closure of the shackle is not orthogonal to the direction of insertion of the link to be hooked in such a way that the two adjacent links do not obstruct screwing of the bolt 85 in the respective hole 83'.

Unlike the embodiments described previously, in this case it is the rotation of a leg of the half-ring and not the sliding of the bolt which performs closure of the shackle; the bolt here only serves to lock closure of the shackle.

Finally, according to a possible variant, the bolt 85 could also be made in the form of a sliding pin pushed by a spring.

What is claimed is:

1. A shackle for connection of an external element to a chain link of a chain, said chain link having a diameter, a pair of opposite rectilinear sections and a pair of opposite arcuate sections joining said pair of opposite rectilinear sections of the chain link, said shackle comprising:

a rigid main body, said main body having an arch with an internal edge and an external edge, a first pair of legs each having a terminal end adjacent to the arch and an enlarged terminal end opposite to the arch, each said enlarged terminal end having an internal and an external edge;

a pair of aligned transverse through holes, each transverse through hole being provided on one of each of said enlarged terminal ends of said first pair of legs;

a bolt transversely insertable through said pair of transverse through holes;

a fork shaped chain link insertion element integral with said rigid main body and comprising:
a second pair of legs;
a transverse portion for connection of said second pair of legs, said transverse portion having an internal edge and an external edge; and
a mouth portion opposite to said transverse portion, said mouth portion having an opening dimension, a height dimension and a depth dimension;

each leg of said second pair of legs being adjacent and internal to a leg of said first pair of legs;

said transverse portion being adjacent and internal to said arch;

said mouth portion being adjacent to said pair of enlarged terminal ends;

said fork shaped insertion element being operable for transversely inserting in said mouth portion said pair of rectilinear opposite sections of said chain link;

said bolt being operable for closure of said mouth portion after insertion of said chain link into said mouth portion;

said opening dimension of said mouth portion of said fork shaped insertion element not exceeding 50% of the diameter of said chain link;

said depth dimension of said mouth portion of said fork shaped insertion element being not lower than the transverse dimension of said chain link; and an opening, delimited by the internal edge of said arch and the external edge of said transverse portion, for connecting said external element to the shackle.

2. The shackle according to claim 1 wherein said height dimension of said mouth portion is set lower than the diameter of the chain link.

3. The shackle according to claim 1 wherein said bolt has a diameter equal to or greater than the diameter of said chain link.

4. The shackle according to claim 1 wherein said fork shaped insertion element is welded with said rigid main body.

5. The shackle according to claim 1 wherein said fork shaped insertion element and said rigid main body are a single piece.

6. The shackle according to claim 5 wherein said second pair of legs coincide with said first pair of legs.

7. The shackle according to claim 6 wherein said first pair of legs have an intermediate section bent outwardly.

8. The shackle according to claim 1 wherein said fork shaped insertion element has means for removably engaging with said rigid main body, comprising a groove extending along an external edge of each of said second pair of legs and at least partially along the external edge of said transverse portion, each of said grooves having a section fitting on one of said first pair of legs, and a section fitting on said arch.

9. The shackle according to claim 8, wherein said means for removably engaging with said rigid main body further comprise a groove along each transverse edge of each end of said second pair of legs, said second pair of legs fitting on said bolt to guide the insertion of said bolt and to support said fork shaped insertion element on said bolt.

10. A shackle for connection of an external element to a chain link of a chain, said chain link having a diameter, a pair of opposite rectilinear sections and a pair of opposite arcuate sections joining said pair of opposite rectilinear sections, said shackle comprising:

an articulated main body, said main body comprising:

an opening for connecting said external element to the shackle;

a mouth portion for insertion of the chain link having an opening dimension, a height dimension and a depth dimension;

a first leg integral with the main body and having an enlarged terminal end adjacent to said mouth portion;

a second leg articulated with the main body and having an enlarged terminal end adjacent to said mouth portion;

the enlarged terminal end of said second leg being rotatable between a first position apart from the enlarged terminal end of said first leg and a second position adjacent to the enlarged terminal end of said first leg;

a distance between said first and second legs, at said second position of said second leg, being set not exceeding 50% of the diameter of said chain link;

a length of said first and second legs being set larger than a transverse dimension of said chain link;

a pair of through holes, each through hole being provided in the enlarged terminal end of said first and second legs, said pair of through holes being aligned at said second position of said second leg; and a bolt insertable through said pair of through holes for closure of said mouth portion at said second position of said second leg.

11. The shackle according to claim 10 wherein a direction of insertion of said bolt has an angle in respect to axes of said first and second legs.

\* \* \* \* \*